US011811772B2

(12) United States Patent
Li et al.

(10) Patent No.: US 11,811,772 B2
(45) Date of Patent: *Nov. 7, 2023

(54) DIFFERENTIATED CONTAINERIZATION AND EXECUTION OF WEB CONTENT BASED ON TRUST LEVEL AND OTHER ATTRIBUTES

(71) Applicant: Intel Corporation, Santa Clara, CA (US)

(72) Inventors: Hong C. Li, El Dorado Hills, CA (US); John B. Vicente, Roseville, CA (US); Prashant Dewan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 210 days.

This patent is subject to a terminal disclaimer.

(21) Appl. No.: 17/127,579

(22) Filed: Dec. 18, 2020

(65) Prior Publication Data

US 2021/0258313 A1  Aug. 19, 2021

Related U.S. Application Data

(63) Continuation of application No. 16/551,221, filed on Aug. 26, 2019, now Pat. No. 10,904,257, which is a (Continued)

(51) Int. Cl.
*H04L 9/40* (2022.01)
*G06F 21/51* (2013.01)
(Continued)

(52) U.S. Cl.
CPC ............ *H04L 63/101* (2013.01); *G06F 21/51* (2013.01); *G06F 21/53* (2013.01); *G06F 2221/2119* (2013.01); *H04L 67/02* (2013.01)

(58) Field of Classification Search
CPC ....... H04L 63/101; H04L 67/02; G06F 21/51; G06F 21/53; G06F 2221/2119
(Continued)

(56) References Cited

U.S. PATENT DOCUMENTS 7,676,843 B1   3/2010   Stott et al.
7,694,328 B2   4/2010   Joshi et al.
(Continued)

FOREIGN PATENT DOCUMENTS

CN   1609810 A    4/2005
CN   101802833 A  8/2010
(Continued)

OTHER PUBLICATIONS

European Patent Office, "Extended European Search Report," mailed in connection with European Patent Application No. 18175836.8, dated Jun. 29, 2018, 7 pages.
(Continued)

*Primary Examiner* — Teshome Hailu
*Assistant Examiner* — Aubrey H Wyszynski
(74) *Attorney, Agent, or Firm* — HANLEY, FLIGHT & ZIMMERMAN, LLC

(57) ABSTRACT

Systems and methods may provide for receiving web content and determining a trust level associated with the web content. Additionally, the web content may be mapped to an execution environment based at least in part on the trust level. In one example, the web content is stored to a trust level specific data container.

21 Claims, 4 Drawing Sheets

Related U.S. Application Data continuation of application No. 15/979,119, filed on May 14, 2018, now Pat. No. 10,397,231, which is a continuation of application No. 15/722,336, filed on Oct. 2, 2017, now abandoned, which is a continuation of application No. 13/830,634, filed on Mar. 14, 2013, now Pat. No. 9,781,118.

(51) Int. Cl.
    *G06F 21/53*     (2013.01)
    *H04L 67/02*     (2022.01)

(58) Field of Classification Search
    USPC .......................................................... 726/4
    See application file for complete search history.

(56) References Cited

U.S. PATENT DOCUMENTS

| | | | |
|---|---|---|---|
| 8,015,606 | B1 | 9/2011 | Jevans et al. |
| 8,359,647 | B1 | 1/2013 | Casalaina et al. |
| 9,781,118 | B2 * | 10/2017 | Li .................. H04L 63/101 |
| 10,397,231 | B2 * | 8/2019 | Li ...................... G06F 21/53 |
| 10,904,257 | B2 * | 1/2021 | Li .................. H04L 63/101 |
| 2005/0149726 | A1 | 7/2005 | Joshi et al. |
| 2005/0256960 | A1 * | 11/2005 | Ganesh .............. H04L 63/105 709/229 |
| 2006/0190606 | A1 | 8/2006 | Kohavi |
| 2007/0239684 | A1 * | 10/2007 | Anderson ............. G06F 16/958 |
| 2009/0165133 | A1 | 6/2009 | Hwang et al. |
| 2009/0249484 | A1 * | 10/2009 | Howard .............. H04L 63/1441 726/22 |
| 2010/0332454 | A1 | 12/2010 | Prahlad et al. |
| 2011/0134935 | A1 | 6/2011 | Campos et al. |
| 2011/0145926 | A1 | 6/2011 | Dalcher et al. |
| 2012/0102098 | A1 | 4/2012 | Guillou et al. |
| 2013/0191519 | A1 * | 7/2013 | Chang .................. G06F 9/5066 709/223 |
| 2014/0229608 | A1 | 8/2014 | Bauer et al. |
| 2018/0124057 | A1 | 5/2018 | Li et al. |
| 2018/0227309 | A1 | 8/2018 | Li et al. |
| 2018/0262509 | A1 | 9/2018 | Li et al. |

FOREIGN PATENT DOCUMENTS

| | | |
|---|---|---|
| CN | 102656559 A | 9/2012 |
| CN | 102782648 A | 11/2012 |

OTHER PUBLICATIONS

State Intellectual Property Office of China, "Second Office Action," mailed in connection with Chinese Patent Application No. 201480008933.3, dated Dec. 29, 2017, 7 pages.

State Intellectual Property Office of China, "Notice on Grant of Patent Right for Invention," mailed in connection with Chinese Patent Application No. 201480008933.3, dated May 9, 2018, 4 pages.

State Intellectual Property Office of China, "First Office Action," mailed in connection with Chinese Patent Application No. 201480008933.3, dated Apr. 21, 2017, 13 pages.

United States Patent and Trademark Office, "Advisory Action," mailed in connection with U.S. Appl. No. 15/722,336, dated Apr. 20, 2018, 2 pages.

United States Patent and Trademark Office, "Final Office Action," mailed in connection with U.S. Appl. No. 15/722,336, dated Feb. 14, 2018, 10 pages.

European Patent Office, "Extended European Search Report," mailed in connection with EP Patent Application No. 14773433.9, dated Jul. 5, 2016, 7 pages.

International Bureau, "International Preliminary Report on Patentability," mailed in connection with International Patent Application No. PCT/US2014/021839, dated Sep. 15, 2015, 7 pages.

International Searching Authority, "Written Opinion," mailed in connection with International Patent Application No. PCT/US2014/021839, dated Jun. 20, 2014, 6 pages.

International Searching Authority, "Search Report," mailed in connection with International Patent Application No. PCT/US2014/021839, dated Jun. 20, 2014, 3 pages.

United States Patent and Trademark Office, "Notice of Allowance," mailed in connection with U.S. Appl. No. 13/830,634, dated Jun. 5, 2017, 18 pages.

United States Patent and Trademark Office, "Final Office Action," mailed in connection with U.S. Appl. No. 13/830,634, dated Jan. 20, 2017, 10 pages.

United States Patent and Trademark Office, "Non-final Office Action," mailed in connection with U.S. Appl. No. 13/830,634, dated Jun. 6, 2016, 13 pages.

United States Patent and Trademark Office, "Final Office Action," mailed in connection with U.S. Appl. No. 13/830,634, dated Sep. 25, 2015, 12 pages.

United States Patent and Trademark Office, "Non-final Office Action," mailed in connection with U.S. Appl. No. 13/830,634, dated Feb. 13, 2015, 13 pages.

European Patent Office, "Communication under Rule 71(3) EPC," mailed in connection with European Patent Application No. 14 773 433.9, dated Dec. 18, 2018, 29 pages.

United States Patent and Trademark Office, "Non-final Office Action," mailed in connection with U.S. Appl. No. 15/941,560, dated Jun. 29, 2018, 12 pages.

United States Patent and Trademark Office, "Notice of Allowance," mailed in connection with U.S. Appl. No. 15/979,119, dated Apr. 9, 2019, 7 pages.

United States Patent and Trademark Office, "Final Office Action," mailed in connection with U.S. Appl. No. 15/979, 119, dated Jan. 11, 2019, 6 pages.

United States Patent and Trademark Office, "Non-final Office Action," mailed in connection with U.S. Appl No. 15/979, 119, dated Jul. 16, 2018, 13 pages.

European Patent Office, "Communication pursuant to Article 94(3) EPC," mailed in connection with European Patent Application No. 18175836.8, dated Sep. 26, 2019, 5 pages.

European Patent Office, "Communication under Rule 71(3) EPC," mailed in connection with European Patent Application No. 18175836.8, dated Jul. 28, 2020, 35 pages.

United States Patent and Trademark Office, "Advisory Action," mailed in connection with U.S. Appl. No. 13/830,634, dated Dec. 31, 2015, 3 pages.

United States Patent and Trademark Office, "Notice of Allowance," mailed in connection with U.S. Appl. No. 16/551,221, dated Oct. 5, 2020, 7 pages.

United States Patent and Trademark Office, "Non-Final Rejection," mailed in connection with U.S. Appl. No. 16/551,221, dated May 19, 2020, 8 pages.

State Intellectual Property Office of China, "First Office Action," mailed in connection with Chinese Patent Application No. 201810820636.9 dated Apr. 30, 2021, 13 pages.

State Intellectual Property Office of China, "Notification to Grant Patent Right for Invention," mailed in connection with Chinese Patent Application No. 201810820636.9, dated Feb. 9, 2022, 3 pages.

European Patent Office, "Communication pursuant to Article 94(3) EPC", in connection with European patent application No. 14773433.9, dated Mar. 17, 2017, 6 pages.

United States Patent and Trademark Office, "Final Action" issued in U.S. Appl. No. 15/941,560 dated Nov. 23, 2018, 6 pages.

United States Patent and Trademark Office, "Notice of Allowance" issued in U.S. Appl. No. 15/941,560 dated Feb. 20, 2019, 7 pages.

* cited by examiner

DIFFERENTIATED CONTAINERIZATION AND EXECUTION OF WEB CONTENT BASED ON TRUST LEVEL AND OTHER ATTRIBUTES

CROSS-REFERENCE TO RELATED APPLICATIONS

This patent arises from a continuation of U.S. patent application Ser. No. 16/551,221, which is entitled "DIFFERENTIATED CONTAINERIZATION AND EXECUTION OF WEB CONTENT BASED ON TRUST LEVEL AND OTHER ATTRIBUTES," and which was filed on Aug. 26, 2019, which is a continuation of U.S. patent application Ser. No. 15/979,119, which is entitled "DIFFERENTIATED CONTAINERIZATION AND EXECUTION OF WEB CONTENT BASED ON TRUST LEVEL AND OTHER ATTRIBUTES," and which was filed on May 14, 2018, which is a continuation of U.S. patent application Ser. No. 15/722,336, which is entitled "DIFFERENTIATED CONTAINERIZATION AND EXECUTION OF WEB CONTENT BASED ON TRUST LEVEL AND OTHER ATTRIBUTES," and which was filed on Oct. 2, 2017, which is a continuation of U.S. patent application Ser. No. 13/830,634, which is entitled "DIFFERENTIATED CONTAINERIZATION AND EXECUTION OF WEB CONTENT BASED ON TRUST LEVEL AND OTHER ATTRIBUTES," and which was filed on Mar. 14, 2013. U.S. patent application Ser. No. 13/830,634, U.S. patent application Ser. No. 15/722,336, U.S. patent application Ser. No. 15/979,119, and U.S. patent application Ser. No. 16/551,221 are hereby incorporated herein by reference in their respective entireties.

BACKGROUND

Embodiments generally relate to access controls for web-based applications. More particularly, embodiments relate to differentiated containerization and execution of web content based on trust level and other attributes.

Emerging markup languages such as HTML5 (Hypertext Markup Language 5, e.g., HTML5 Editor's Draft 8 May 2012, World Wide Web Consortium/W3C, www*w3*org), LLVM (e.g., LLVM 3.1, May 22, 2012, llvm.org), and other runtime or just in time (JIT) environment languages may support more robust multimedia related web platform development. The use of these languages by a web application developer, however, may also expose client device hardware that would otherwise be inaccessible by traditional web content. While recently developed "sandboxing" solutions may provide some level of protection by preventing certain functions when code is sent as part of a web page, there remains considerable room for improvement. For example, conventional sandboxing solutions may not adequately distinguish between trustworthy sources of web content and untrustworthy sources of web content. As a result, client devices may be vulnerable to attack by malware (malicious software) and other sources of web content.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
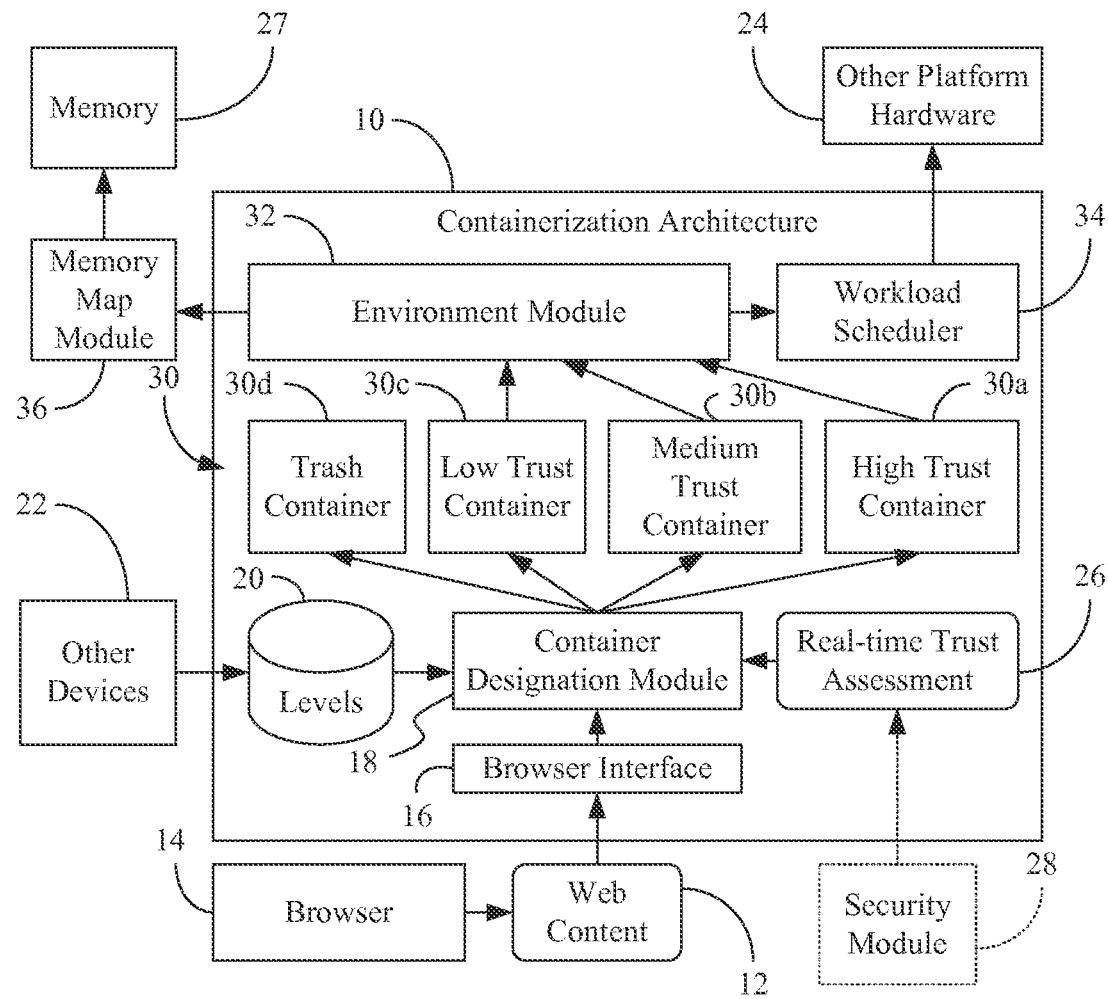
FIG. 1 is a block diagram of an example of a containerization architecture having a plurality of trust level specific data containers according to an embodiment.

Turning now to FIG. 1, a containerization architecture 10 is shown in which web content 12 such as web applications, web code, services, "mash-ups", etc., associated with a browser 14 is mapped to an execution environment based on trust level information corresponding to the web content 12. The term "containerization" may refer to the organization of web content information (e.g., objects) into one or more "containers" represented as a class, data structure, abstract data type (ADT), binaries, other executable codes, etc., whose instances may be collections of other objects. The containerization of the web content 12 may follow specific access rules, wherein the illustrated architecture 10 incorporates trust levels as part of those rules. In the illustrated example, a browser interface 16 receives the web content 12 and a container designation module 18 determines a trust level associated with the web content 12. In this regard, the web content 12 may incorporate a runtime or JIT environment language such as, for example, HTML5, LLVM, and so forth, that enables greater access to local platform hardware 24 and/or memory 26 than traditional web content. Accordingly, the use of trust levels to containerize the web content 12 and map the web content 12 to an execution environment may provide significantly improved runtime protection, as will be discussed in greater detail.

The container designation module 18 may access a trust level database 20, which is populated with data from other devices 22 (e.g., machines and/or users), wherein the information in the trust level database 20 may in turn be used to determine the trust level. For example, the trust level database 20 might include information regarding "whitelist" sites, "greylist" sites, "blacklist" sites, etc., as well as other origin data such as, for example, provider information, application developer information, mash-up origin and/or behavior information, etc. The container designation module 18 may also use a real-time trust assessment 26 to determine the trust level of the web content 12, wherein the real-time trust assessment 26 may be generated internally by the containerization architecture 10 (e.g., as part of a security tool plug-in) or obtained from another security module 28 (e.g., third party security software). More particularly, c.

The illustrated architecture 10 also includes a plurality of trust level specific data containers 30 (30a-30d) to organize and/or store the web content 12 according to one or more trust levels corresponding to the web content 12. For example, a high trust container 30a may be used to store content associated with whitelist sites, wherein content in the high (e.g., "native") trust container 30a may be considered very trustworthy and treated similarly as native code from the perspective of the execution environment. A medium trust container 30b, on the other hand, may be used to store content associated with greylist sites, wherein content in the medium (e.g., "browser application") trust container 30b may be considered moderately trustworthy and treated similarly as browser applications from the perspective of the execution environment. Additionally, a low trust container 30c may be used to store content associated with unknown sites, wherein content in the low (e.g., "testing") trust container 30c may be considered potentially untrustworthy and treated similarly as content from new web sites. The illustrated architecture 10 also includes a trash container 30d that may be used to store content associated with blacklist sites, wherein content in the trash container 30d may be blocked from execution and/or deleted.

An environment module 32 may map the web content 12 to an execution environment based at least in part on the trust level associated with the web content 12. Thus, the environment module 32 may use a work scheduler 34 to allocate resources in the platform hardware 24 such as processors (e.g., central processing unit/CPU, graphics processing unit/GPU, input output (IO) controllers (e.g., display, audio, video, network), etc., for execution of one or more workloads associated with the web content 12. Similarly, the environment module 32 may use a memory map module 36 (e.g., input output memory management unit/IOMMU) to conduct one or more memory transactions associated with the web content 12. Of particular note is that the scheduling of workloads, allocation of resources, and conduct of memory transactions may all be a function of the trust level associated with the web content 12.

More particularly, the type of container 30 holding the underlying web content 12 may determine how the workload scheduler 34 allocates resources and schedules workloads, as well as how the memory map module 36 executes memory transactions with respect to the memory 26. For example, all platform resources may be available to workloads associated with content in the high trust container 30a, whereas only a subset of the platform resources might be available to workloads associated with content in the medium trust container 30b. Workloads associated with content in the low trust container 30c, on the other hand, may have only limited access to platform resources and workloads associated with content in the trash container 30d may be prevented from any access to the platform hardware whatsoever. Additionally, certain restricted areas of the memory 26 may be prevented from access by web content in the trash container 30d, the low trust container 30c and/or the medium trust container 30b. As will be discussed in greater detail, other context attributes such as, for example, stack composition (e.g., code logic, data presentation, data consumption), latency of one or more web transactions, content objective (e.g., correlation between type of web site and data consumed), service/site type, etc., associated with the web content 12, may also be used to containerize the web content 12 and select an execution environment for the web content 12.

Figure 2:
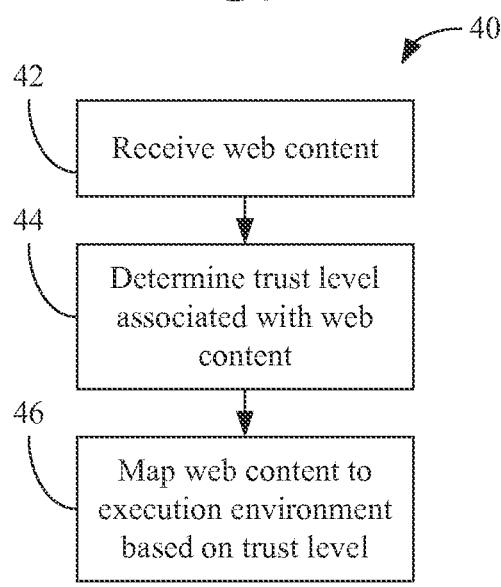
FIG. 2 is a flowchart of an example of a method of using trust levels to differentiate web content according to an embodiment.

Turning now to FIG. 2, a method 40 of using trust levels to differentiate web content is shown. The method 40 may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. Moreover, the method 40 may be implemented as the containerization architecture 10 (FIG. 1) using any of the aforementioned circuit technologies.

Illustrated processing block 42 provides for receiving web content such as, for example, web applications, web code, services, etc., wherein at least a portion of the web content may incorporate a runtime or JIT environment language such as, for example, HTML5, LLVM, and so forth. Block 44 may determine a trust level associated with the web content. As already noted, the determination at block 44 may take into consideration information in a trust level database, one or more real-time trust level assessments, etc., or any combination thereof. Illustrated block 46 maps the web content to an execution environment based on the trust level, wherein using the trust level to select an execution environment for the web content may provide significantly improved runtime protection.

Figure 3:
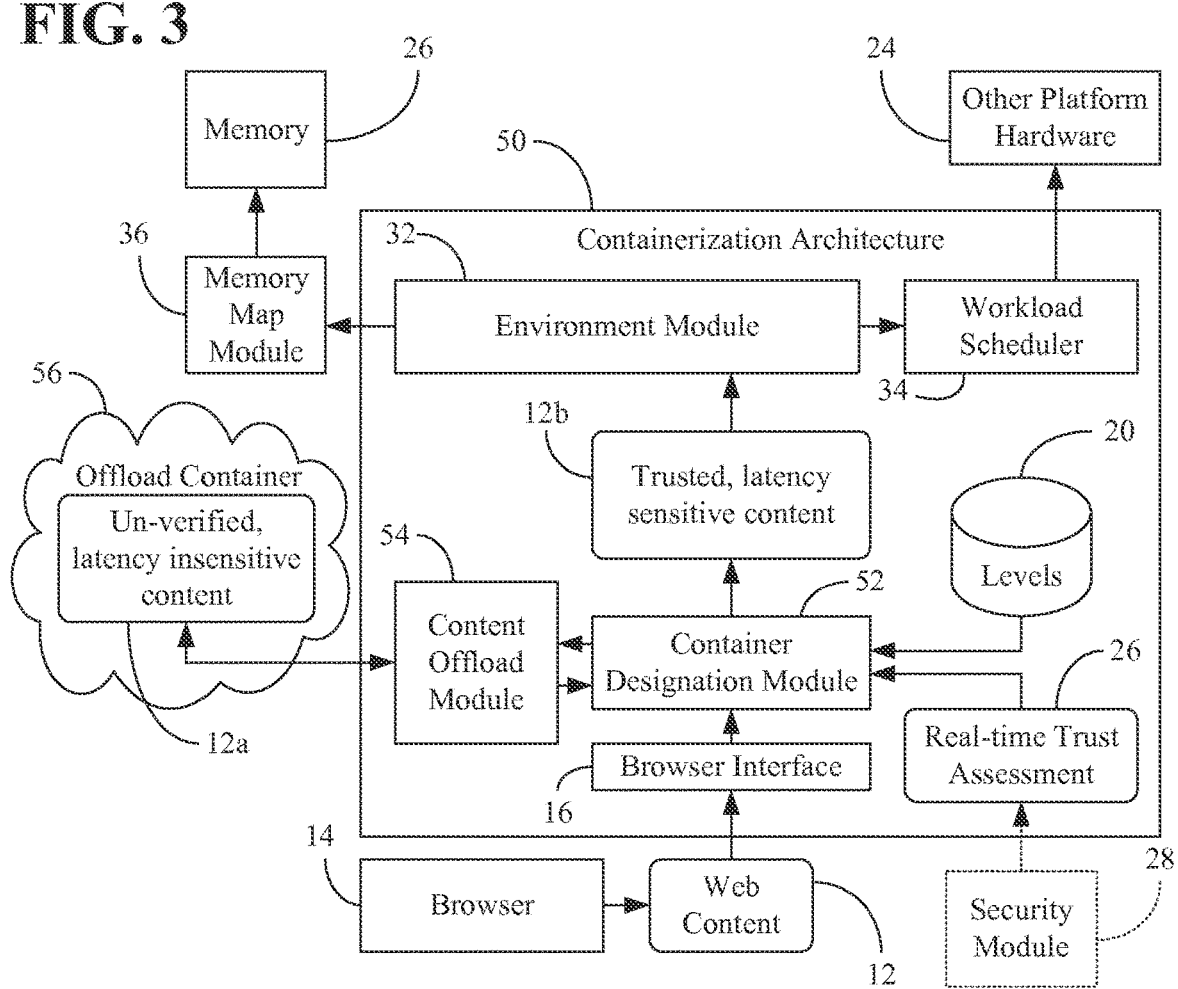
FIG. 3 is a block diagram of an example of a containerization architecture having a content offload module according to an embodiment.

FIG. 3 shows a containerization architecture 50 in which the web content 12 (12a, 12b) may be split between a local execution environment and an "offload" execution environment. In the illustrated example, the browser interface 16 receives the web content 12 and a container designation module 52 determines a trust level associated with the web content 12 based on, for example, information from the trust level database 20 and/or one or more real-time trust assessments 26. As already noted, the real-time trust assessments 26 may be obtained from a security module 28 such as a built-in assessment tool, a separate security tool, an enterprise information technology module, a cloud module, or any combination thereof. The architecture 50 may also include a content offload module 54 that selectively sends a portion 12a of the web content 12 to an offload container 56, wherein the offload container 56 may be associated with a provider of the web content 12, an emulation module of the local computing device/platform, an enterprise data center, a private cloud, a third party service provider, and so forth, in order to map the portion 12a of the web content 12 to another, more risk tolerant execution environment.

More particularly, the container designation module 52 may detect situations in which the trust level is relatively low (e.g., trust level is below a threshold) and execution latency is tolerated (e.g., a latency tolerance condition is satisfied), wherein in such situations, the portion 12a of the web content 12 directed to the offload container 56 may represent unverified, latency insensitive web content. In such a case, a result associated with the offload container 56 may be received from the entity and/or processor corresponding to the offload container 56. If, on the other hand, the illustrated container designation module 52 determines that either the trust level is relatively high or execution latency is not tolerated, the content may be processed locally as the trusted, latency sensitive portion 12b of the web content 12. The environment module 32 may use the workload scheduler 34 and/or memory map module 36 to map the portion 12b of the web content 12 to an execution environment based on the trust level of the portion 12b, as already discussed.

Figure 4:
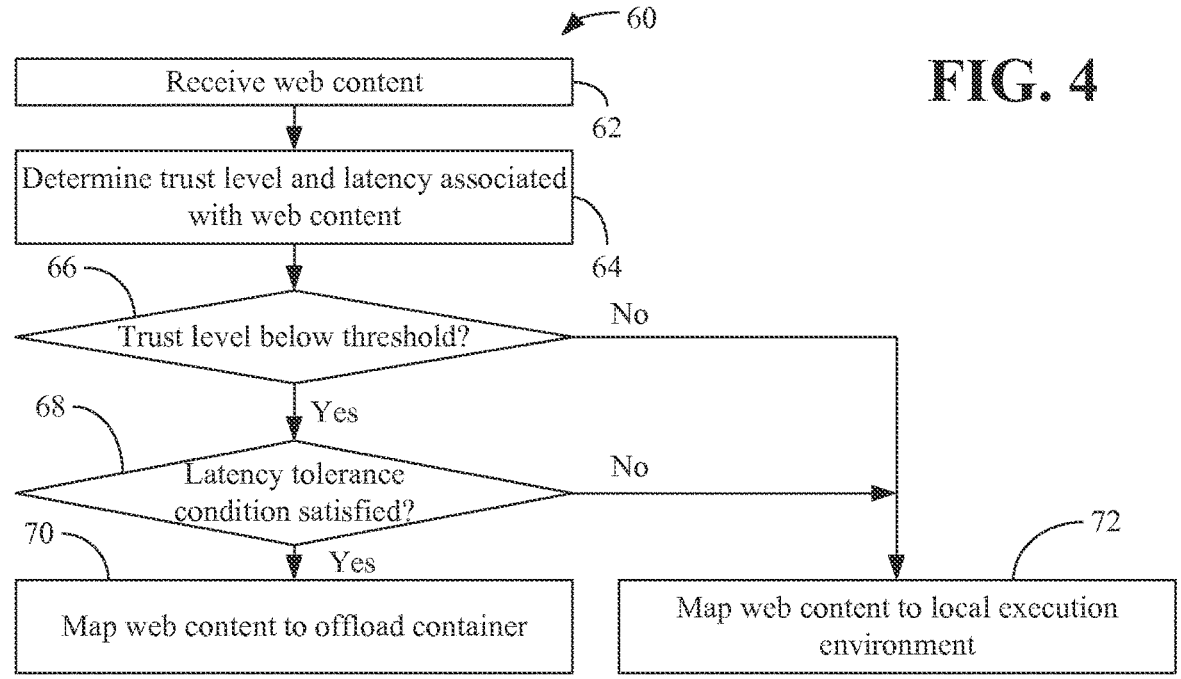
FIG. 4 is a flowchart of an example of a method of using trust levels and offload containers to differentiate web content according to an embodiment.

FIG. 4 shows a method 60 of using trust levels and offload containers to differentiate web content. The method 40 may be implemented as a set of logic instructions and/or firmware stored in a machine- or computer-readable medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 62 provides for receiving web content, wherein a trust level and latency may be determined for the web content at block 64. Determining the latency might involve identifying how much execution latency will result from offloading at least a portion of the web content to another execution environment, which may reside on a different platform, system and/or network (e.g., web content provider, local emulation module, enterprise data center, private cloud, third party service provider, etc.). For example, it might be estimated at block 64 that a particular unit of work associated with the web content is most likely to take x milliseconds to process on a third party service provider.

Block 66 may determine whether the trust level is below a particular threshold. If so, illustrated block 68 determines whether a latency tolerance condition is satisfied. The latency tolerance condition may take into consideration historical information, quality of service (QoS) information, service level agreement (SLA) information, and so forth, wherein the determination at block 68 may involve conducting a comparison between, for example, the latency determined at block 64 and a maximum execution latency. If the latency tolerance condition is satisfied (e.g., latency is below the maximum execution latency), illustrated block 70 maps the corresponding portion of the web content to an offload container. If, on the other hand, either the trust level is not below the particular threshold or the latency tolerance condition is not satisfied, block 72 may map the corresponding portion of the web content to a local execution environment. Block 72 may take the trust level into consideration when deciding which platform resources to expose to the web content.

As already noted, other context attributes such as, for example, stack composition, content objective, service type, and so forth, may also be used to determine a trust level for the web content. For example, if the code logic as reflected in the stack composition of the web content indicates that the web content involves one type of activity (e.g., login cookie retrieval), but the data presented to the user involves another type of activity (e.g., social networking, instant messaging/IM), it might be inferred that the trust level of the web content is relatively low. Other trust level inferences may also be made, even if the origin of the web content is not documented in the trust level database.

Figure 5:
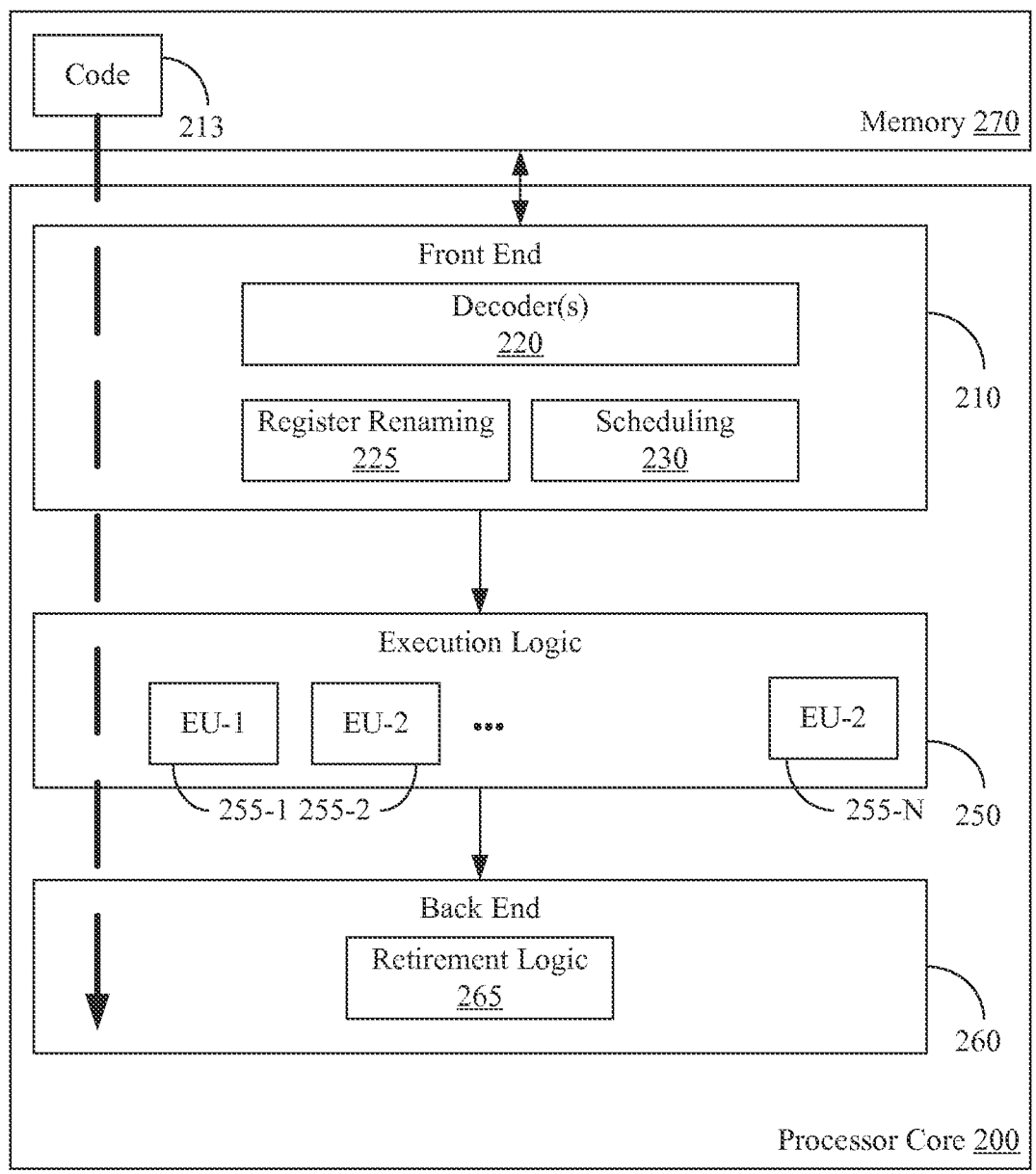
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the containerization architecture 10 (FIG. 1) and/or the containerization architecture 50 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
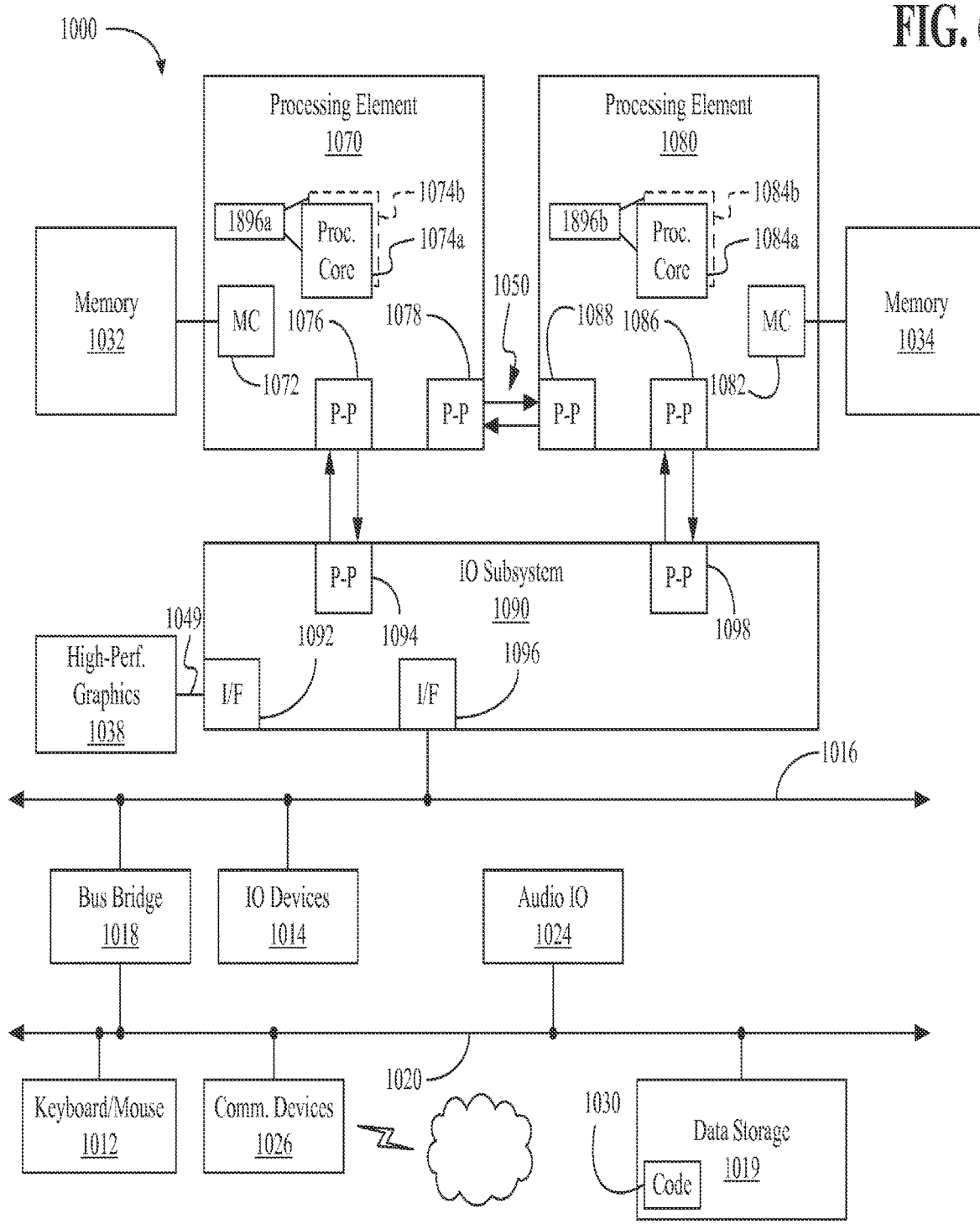
FIG. 6 is a block diagram of an example of a system according to an embodiment.

Referring now to FIG. 6, shown is a block diagram of a system 1000 embodiment in accordance with an embodiment of the present invention. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 5.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 6, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the containerization architecture 10 (FIG. 1) and/or the containerization architecture 50, and may be similar to the code 213 (FIG. 5), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example one may therefore include a method of differentiating web content in which web content is received and a trust level associated with the web content is determined. The method may also provide for mapping the web content to an execution environment based at least in part on the trust level.

Additionally, the method of example one may further include storing the web content to a trust level specific data container.

Additionally, the web content of the example one method may be mapped to the execution environment further based on a context attribute including one or more of a stack composition associated with the web content, a latency of one or more web transactions associated with the web content, an objective of the web content and a service type associated with the web content.

Moreover, mapping the web content to the execution environment in the method of example one may further include sending at least a portion of the web content to an offload container associated with one or more of a provider of the web content, an emulation module of a local computing device, an enterprise data center, a private cloud and a third party service provider, and receiving a result associated with the offload container.

In addition, at least a portion of the web content in the method of example one may be sent to the offload container if the trust level is below a threshold and a latency tolerance condition is satisfied.

In addition method of example one may further include accessing a trust level database, wherein the trust level is determined based at least in part on the trust level database.

Moreover, the method of example one may further include obtaining a real-time trust level assessment, wherein the trust level is determined based at least in part on the real-time trust level assessment.

Additionally, obtaining the real-time trust level assessment in the example one method may include generating the real-time trust level assessment.

Additionally, mapping the web content to the execution environment in the example one method may include scheduling one or more workloads associated with the web content based at least in part on the trust level, provisioning one or more resources for the one or more workloads, and conducting one or more memory transactions associated with the web content based at least in part on the trust level.

Example two may include at least one computer readable storage medium comprising a set of instructions which, if executed by a processor, cause a computing device to perform the method of example one.

Example three may include a web content differentiation apparatus having a browser interface to receive web content and a container designation module to determine a trust level associated with the web content. The apparatus may also have an environment module to map the web content to an execution environment based at least in part on the trust level.

Additionally, the apparatus of example three may further include a plurality of trust level specific data containers, wherein the container designation module is to store the web content to one or more of the plurality of trust level specific data containers.

Additionally, the web content of the example three apparatus may be mapped to the execution environment further based on a context attribute including one or more of a stack composition associated with the web content, a latency of one or more web transactions associated with the web content, an objective of the web content and a service type associated with the web content.

Moreover, the apparatus of example three may further including a content offload module to send at least a portion of the web content to an offload container associated with one or more of a provider of the web content, an emulation module of a local computing device, an enterprise data center, a private cloud and a third party service provider to map the web content to the execution environment, and to receive a result associated with the offload container.

In addition, at least a portion of the web container in the example three method may be sent to the offload container if the trust level is below a threshold and a latency tolerance condition is satisfied.

In addition, the apparatus of example three may further include a trust level database, wherein the trust level is to be determined based at least in part on the trust level database.

Moreover, the container designation module in the example three apparatus may obtain a real-time trust level assessment, wherein the trust level is to be determined based at least in part on the real-time trust level assessment.

Additionally, the apparatus of example three may further include a security module to generate the real-time trust level assessment.

Additionally, the security module of example three may be one or more of a built-in assessment tool, a separate security tool, an enterprise information technology module and a cloud module.

Moreover, the apparatus of example three may further include a workload scheduler to schedule one or more workloads associated with the web content based at least in part on the trust level and to provision one or more resources for the one or more workloads, wherein the environment module is to conduct one or more memory transactions associated with the web content based at least in part on the trust level.

Techniques described herein may therefore enable differentiated containerization that provides different client execution environments (e.g., memory, CPU, graphics, network, operating system/OS) for web content based on the trust level of the originator of the web content. Moreover, improved runtime protection of client devices from malware (malicious software), and other web content from unknown sources. Other context attributes such as stack composition (code logic, data presented, data consumed), latency of web transactions, purpose of the content, service type, and so forth, may also be used to differentiate web content and configure execution environments. In addition, web content may be split between the client device, cloud computing resources (e.g., content provider, enterprise data center, private cloud, third party service provider), based on trust level, latency, etc. The containerization modules may be implemented as an independent security application, an add-on to security tool (e.g., Secure Enclave, McAfee® DeepSafe), in firmware, etc., or any combination thereof. Techniques may also provide for correlating real-time assessment data from other security applications and/or resources.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A networked processor platform comprising:
   at least one memory;
   instructions in the networked processor platform; and
   processor circuitry to execute the instructions to at least:
      determine a level of trust associated with a workload at the networked processor platform, the workload to be executed; and
      offload execution of the workload from the networked processor platform to a cloud platform different from the networked processor platform based at least in part on the level of trust associated with the workload, the networked processor platform to communicate with the cloud platform via a network.

2. The networked processor platform of claim 1, wherein the processor circuitry is to obtain a real-time trust assessment of the workload to determine the level of trust associated with the workload.

3. The networked processor platform of claim 2, wherein the processor circuitry is to execute a security tool to obtain the real-time trust assessment.

4. The networked processor platform of claim 2, wherein the processor circuitry is to obtain the real-time trust assessment from the cloud platform.

5. The networked processor platform of claim wherein the processor circuitry is to:
   determine whether a latency condition associated with the execution of the workload is satisfied; and
   offload the execution of the workload to the cloud platform based at least in part on the level of trust associated with the workload and whether the latency condition associated with the execution of the workload is satisfied.

6. The networked processor platform of claim 5, wherein the processor circuitry is to estimate an amount of time to execute the workload on the cloud platform, the latency condition to be satisfied when the amount of time is less than a threshold.

7. The networked processor platform of claim 1, wherein to offload the execution of the workload to the cloud platform, the processor circuitry is to:
   provide the workload to a container associated with the cloud platform; and
   access, from the container, a result of the execution of the workload by the cloud platform.

8. At least one computer readable storage device comprising computer readable instructions that, when executed, cause a networked processor platform to at least:
   determine a level of trust associated with a workload at the networked processor platform, the workload to be executed; and
   offload execution of the workload from the networked processor platform to a cloud platform different from the networked processor platform based at least in part on the level of trust associated with the workload, the networked processor platform to communicate with the cloud platform via a network.

9. The at least one computer readable storage device of claim 8, wherein the instructions are to cause the networked processor platform to obtain a real-time trust assessment of the workload to determine the level of trust associated with the workload.

10. The at least one computer readable storage device of claim 9, wherein the instructions are to cause the networked processor platform to execute a security tool to obtain the real-time trust assessment.

11. The at least one computer readable storage device of claim 9, wherein the instructions are to cause the networked processor platform to obtain the real-time trust assessment from the cloud platform.

12. The at least one computer readable storage device of claim 8, wherein the instructions are to cause the networked processor platform to:
determine whether a latency condition associated with the execution of the workload is satisfied; and
offload the execution of the workload to the cloud platform based at least in part on the level of trust associated with the workload and whether the latency condition associated with the execution of the workload is satisfied.

13. The at least one computer readable storage device of claim 12, wherein the instructions are to cause the networked processor platform to estimate an amount of time to execute the workload on the cloud platform, the latency condition to be satisfied when the amount of time is less than a threshold.

14. The at least one computer readable storage device of claim 8, wherein to offload the execution of the workload to the cloud platform, the instructions are to cause the networked processor platform to:
provide the workload to a container associated with the cloud platform; and
access, from the container, a result of the execution of the workload by the cloud platform.

15. A method comprising:
determining, by executing an instruction with a networked processor platform, a level of trust associated with a workload at the networked processor platform, the workload to be executed; and
offloading execution of the workload from the networked processor platform to a cloud platform different from the networked processor platform based at least in part on the level of trust associated with the workload, the networked processor platform in communication with the cloud platform via a network.

16. The method of claim 15, wherein the determining of the level of trust is based on a real-time trust assessment of the workload.

17. The method of claim 16, further including executing a security tool to obtain the real-time trust assessment.

18. The method of claim 16, further including obtaining the real-time trust assessment from the cloud platform.

19. The method of claim 15, further including determining whether a latency condition associated with the execution of the workload is satisfied, wherein the offloading of the execution of the workload to the cloud platform is based at least in part on the level of trust associated with the workload and whether the latency condition associated with the execution of the workload is satisfied.

20. The method of claim 19, further including estimating an amount of time to execute the workload on the cloud platform, wherein the latency condition is satisfied when the amount of time is less than a threshold.

21. The method of claim 15, wherein the offloading of the execution of the workload to the cloud platform includes:
providing the workload to a container associated with the cloud platform; and
accessing, from the container, a result of the execution of the workload by the cloud platform.

* * * * *